United States Patent [19]

van der Lely

[11] Patent Number: 4,836,456
[45] Date of Patent: Jun. 6, 1989

[54] AGRICULTURAL SPREADER HAVING MULTIPLE DISTRIBUTION MEMBERS BROADCASTING MATERIAL SIMULTANEOUSLY TO GENERALLY THE SAME AREA

[76] Inventor: Cornelis van der Lely, 7 Brüschenrain,, Zug, Switzerland

[21] Appl. No.: 129,322

[22] Filed: Nov. 25, 1987

Related U.S. Application Data

[63] Continuation of Ser. No. 766,410, Aug. 16, 1985, abandoned.

[30] Foreign Application Priority Data

Aug. 17, 1984 [NL] Netherlands ............... 8402525
Aug. 17, 1984 [NL] Netherlands ............... 8402526

[51] Int. Cl.⁴ .................................................. A01C 17/00
[52] U.S. Cl. .................................... 239/682; 239/661; 239/665
[58] Field of Search .............. 239/661, 665, 670, 682, 239/683, 684, 687, 681

[56] References Cited

U.S. PATENT DOCUMENTS

| | | |
|---|---|---|
| 1,629,248 | 5/1927 | Bailey . |
| 1,779,926 | 10/1930 | Baker . |
| 2,638,351 | 5/1953 | Stornetta et al. ............ 239/682 |
| 3,368,762 | 2/1968 | Dreyer ............................ 239/682 |
| 4,351,481 | 9/1982 | Dreyer .......................... 239/683 X |

FOREIGN PATENT DOCUMENTS

| | | |
|---|---|---|
| 352454 | 9/1979 | Austria . |
| 74155 | 3/1983 | European Pat. Off. ............ 239/682 |
| 84872 | 8/1983 | European Pat. Off. ............ 239/687 |
| 2444087 | 3/1976 | Fed. Rep. of Germany . |
| 2556475 | 7/1976 | Fed. Rep. of Germany . |
| 2652740 | 8/1977 | Fed. Rep. of Germany . |
| 2818227 | 11/1979 | Fed. Rep. of Germany . |
| 3337762 | 4/1985 | Fed. Rep. of Germany . |
| 594755 | 9/1925 | France . |
| 1431726 | 2/1966 | France . |
| 1523961 | 5/1968 | France . |
| 1532897 | 7/1968 | France . |
| 2015524 | 4/1970 | France . |
| 2410427 | 8/1979 | France ............................ 239/681 |
| 598703 | 2/1948 | United Kingdom ............ 239/682 |
| 733935 | 7/1955 | United Kingdom ............ 239/682 |
| 1499541 | 2/1978 | United Kingdom . |
| 1509085 | 4/1978 | United Kingdom . |
| 2013464 | 8/1979 | United Kingdom . |
| 1569986 | 6/1980 | United Kingdom . |
| 2034163 | 6/1980 | United Kingdom ............ 239/682 |
| 2020154 | 9/1982 | United Kingdom . |
| 2128863 | 5/1984 | United Kingdom ............ 239/682 |
| 2150403 | 7/1985 | United Kingdom . |
| 2164833 | 4/1986 | United Kingdom . |

Primary Examiner—Andres Kashnikow
Attorney, Agent, or Firm—Penrose Lucas Albrigt; Robert A. Miller

[57] ABSTRACT

A spreader comprises four spreader members which, in operation, all spread material over substantially the same sector at the same time. The two central spreader members are lower than the two outer spreader members to avoid collisions between particles ejected from the different members. The hopper has four discharge funnels, each provided with a discharge outlet, the aperture size of which is controlled by a doser member. All of the doser members are rigidly connected together so that they move in unison and open each outlet opening initially in its central part considered in a direction transverse to the spreader's usual direction of travel. The hopper is very large, having a width of between two hundred sixty and three hundred centimeters.

58 Claims, 5 Drawing Sheets

FIG. 4

FIG. 5

AGRICULTURAL SPREADER HAVING MULTIPLE DISTRIBUTION MEMBERS BROADCASTING MATERIAL SIMULTANEOUSLY TO GENERALLY THE SAME AREA

The instant application is a continuation application of application Ser. No. 766,410 filed Aug. 16, 1985, now abandoned.

SUMMARY OF THE INVENTION

This invention relates to an agricultural machine in the form of a spreader for spreading material over the land. Known spreaders for this purpose comprise a frame having at least one hopper and at least two spreader members which, during operation, both distribute the material over at least substantially the same area.

According to one aspect of the present invention there is provided a spreader comprising a frame, a hopper and at least three spreader members which, in operation, all distribute material over substantially the same area as each other.

With such a construction, any irregularities in the spreading action of one of the spreader members will be compensated for by any irregularities in the spreading action of the other spreader members.

As the quantity of material to be distributed over the field per unit of time is to spread by at least three different spreader members, the quantity of material to be spread will be done so via at least three trajectories, which has a very advantageous effect on the uniform distribution.

In an embodiment in accordance with the present invention, at least one of the spreader members is disposed higher above the field than the other spreader member or members. Because of this difference in height the material will likewise be distributed over the field from different heights, which may be advantageous for a uniform spread. This difference in spreader member height will further prevent material spread from one spreader member from being hindered or otherwise affected by material spread by the other spreader member.

An advantageous embodiment is obtained when the machine is provided with four spreader members, two of which are at one height and the other two being at a different height.

In a preferred embodiment, the spreader members are provided on shafts which extend upwardly and are supported by bearings in a drive assembly including a drive shaft to which the spreader member shafts are drivably connected. In this way an advantageous drive of the spreader members is obtained. The spreader members can be mounted in a simple way while the construction of the spreader can be simple.

In accordance with a still further embodiment, each spreader member and a stirrer member are both connected to drive means which includes transmission means with variable transmission ratios, so that both the spreader member and the stirrer member can optionally be driven at either one of at least two different speeds. In this way the spread of the material can be advantageously influenced and a constant feed of material from the hopper of the spreader members can be ensured.

According to a second aspect of the present invention there is provided a spreader comprising a frame, a hopper and a spreader member for spreading the material, the hopper having at least three discharge outlets near each of which a doser member is provided, the doser members being rigidly connected to each other by a single adjusting arm for simultaneous movement over the same distance as each other for closing the respective discharge outlets to a greater or lesser extent.

With this construction, the doser members have fixed positions relative to each other and perform the same motions, so that differences between the flow of material through the different outlets are substantially prevented and a more uniform distribution is ensured to a better extent.

According to a third aspect of the present invention there is provided a spreader comprising a frame, a hopper and at least two spreader members, the hopper having a width, measured perpendicular to the normal intended direction of operative travel of the spreader, which is not less than approximately two hundred sixty centimeters and is not more than approximately three hundred centimeters.

For a better understanding of the present invention and to show how it may be carried into effect reference will now be made, by way of example, to the accompanying drawings, in which:

BRIEF DESCRIPTION OF THE DRAWINGS

FIG. 1 is a front view of a spreader;

FIG. 2 is a plan view of the spreader of FIG. 1 on a reduced scale;

FIG. 3 is a rear view of the spreader;

FIG. 4 is a side view of the spreader, taken in the direction of the arrow IV in FIG. 2;

FIG. 5 is a sectional view, on an enlarged scale, taken on the line V—V in FIG. 2;

FIG. 6 is a sectional view taken on the line VI—VI in FIG. 5;

FIG. 7 is an underneath view taken in the direction of the arrow VII in FIG. 5;

FIG. 8 is a schematic plan view of spreader members of the spreader, showing their relative orientations; and FIG. 9 corresponds to FIG. 8 but shows different relative orientations for the spreader members.

DESCRIPTION OF THE PREFERRED EMBODIMENT

The spreader shown in the Figures has a frame 1 which supports a hopper 2 and spreader members 3, 4, 5 and 6. The spreader members are situated under the hopper 2.

The frame 1 has two parallel supporting pillars 10 and 11, which are vertical when the spreader is in a horizontal position. The upper ends of these supporting pillars 10 and 11 are interconnected by a horizontal upper beam 12. The bottom ends of the supporting pillars are interconnected by a horizontal lower beam 13 which is parallel to the upper beam 12. The distance 14 between the supporting pillars 10 and 11 is less than the length 15 of the lower beam 13. The length 16 of the upper beam 12 is greater than the length 15. The length 16 is more than twice the distance 14. The vertical frame portion formed by the pillars 10 and 11 and the beams 12 and 13 is in front of the hopper, with respect to the normal intended direction 17 of operative travel of the spreader. Two bottom beams 18 extend rearwardly from the lower beam 13. The bottom beams 18 converge towards the rear, and are connected together where they meet by a U-shaped coupling bracket 19.

The members 10 to 18 are preferably box sections of rectangular cross-section.

Two coupling plates 20 are provided near the midpoint of the upper beam 12. Coupling plates 21, 22 and 23 are fixed to the front of each of the supporting pillars 10 and 11. The frame 1 has two -U-shaped, parallel bearing arms 24 and 25, which extend horizontally to the rear from the rear sides of the supporting pillars 10 and 11.

Figure 1:
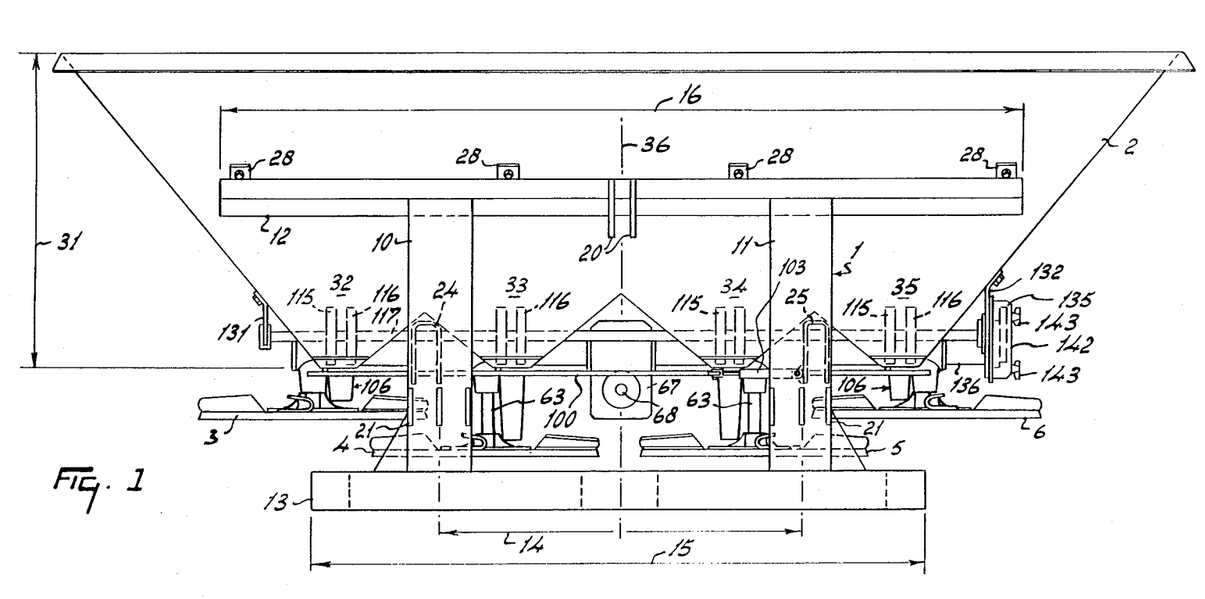

The front side of the hopper is fastened to lugs 28, which are provided on the upper beam 12. The upper periphery of the hopper 2 is rectangular with its major dimension 29 extending transversely of the direction 17. Preferably, the length 29 exceeds two hundred and sixty centimeters and is less than three hundred centimeters. The width 30 of the upper periphery of the hopper 2 extends in the direction 17 and is less than the length 29. In the illustrated embodiment, the width 30 is somewhat less than two-thirds of the length 29. The hopper 2 has a depth 31, which is approximately equal to one third of the length 29. Thus, the hopper has a large storage capacity of, for example, two thousand liters. The hopper 2 converges downwardly and has at its bottom four separate discharge funnels 32, 33, 34 and 35. The bearing arms 24 and 25 extend to between the discharge funnels 32, 33 and 34, 35, respectively. The oppositely facing sides of the respective discharge funnels rest on the upper sides of the bearing arms 24 and 25, as shown in FIG. 1.

Figure 6:
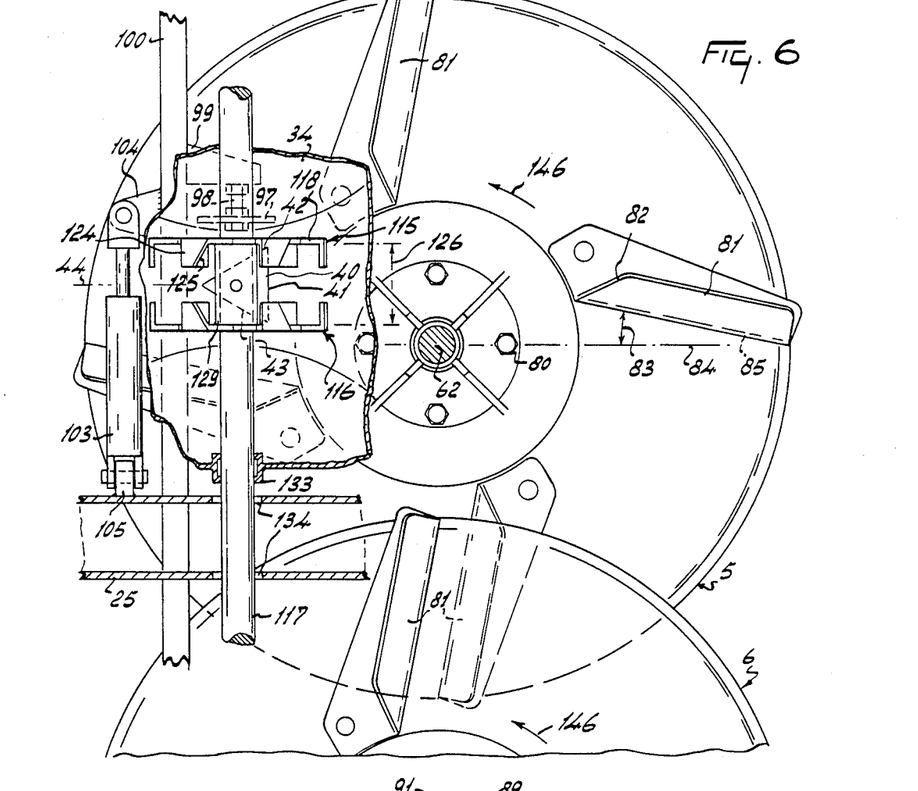
Figure 7:
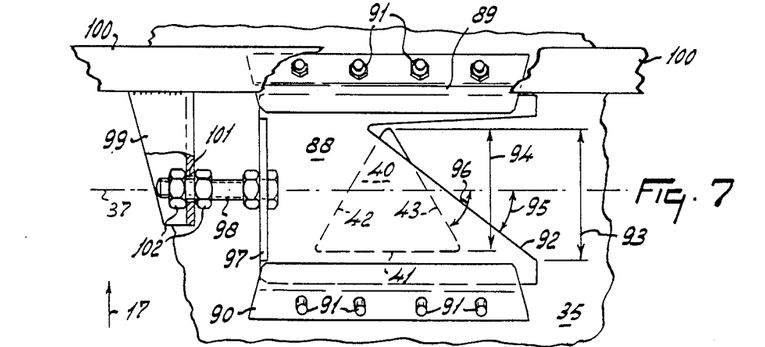

The frame 1 and the hopper 2 are symmetrical about a central plane 36, which contains the longitudinal center line of the machine and, when the spreader is in the horizontal position, is vertical and extends in the direction 17. The hopper 2 is in all further respects substantially symmetrical about a transverse vertical plane 37, which is perpendicular to the plane 36. The bottom ends of the discharge funnels 32 to 35, which constitute the lower ends of the hopper, are arcuate, being centered on a transverse axis 38, which, when the spreader is horizontal, extends horizontally and lies in the plane 37. The resultant curved bottoms 39 of the discharge funnels 32 to 35 each have an outlet opening 40. The outlet openings are polygonal; in the illustrated embodiment, as shown in FIGS. 6 and 7, they are triangular. One side 41 of the triangle is parallel to the plane 37 and the axis 38. This side 41 is situated behind the plane 37. The opening narrows in the forward direction, its sides 42 and 43 converging to form an equilateral triangle with the side 41. The triangular opening 40 is symmetrical about a plane 44, which is perpendicular to the side 41 and to the plane 37 and passes through the point where the sides 42 and 43 meet. Each plane 44 is disposed symmetrically relative to the respective discharge funnel. Thus, each of the four discharge funnels 32 and 35 has only one outlet 40, all four outlets extending in the same direction as the outlet 40 shown in FIG. 6. The plane 44 is parallel to the plane 36. Viewed from above, the outlet 40 of each discharge funnel 32 to 35 opens above the respective spreader members 3 to 6, as shown more specifically in FIG. 2.

Figure 3:
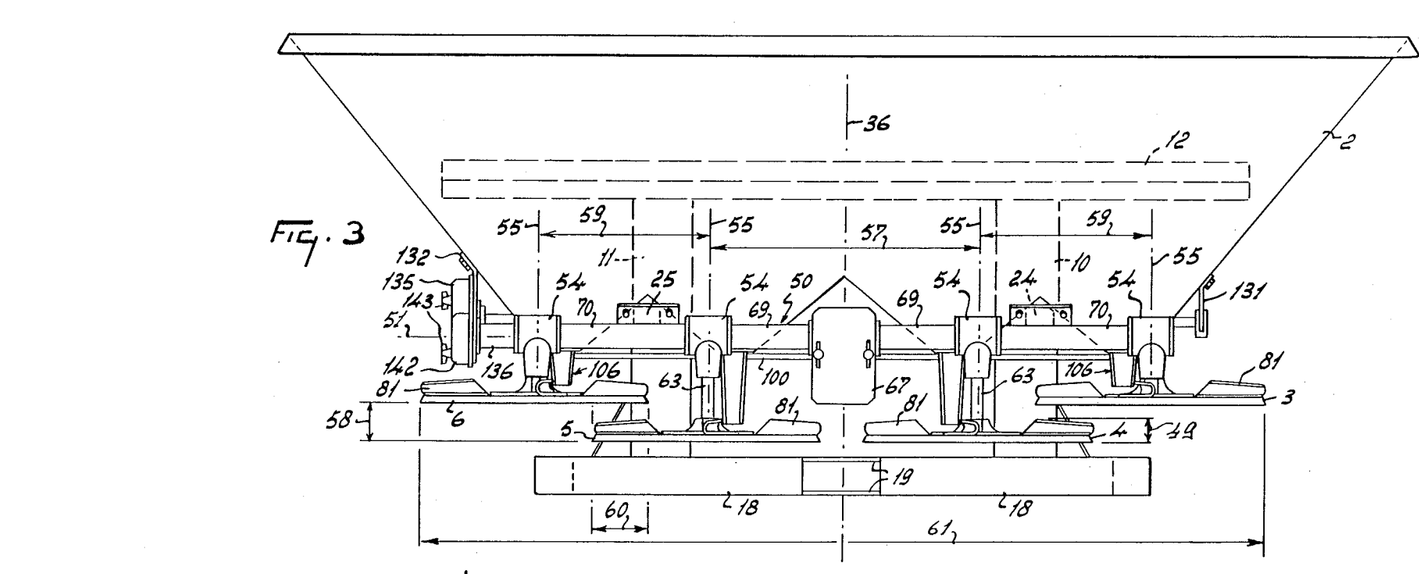
Figure 4:
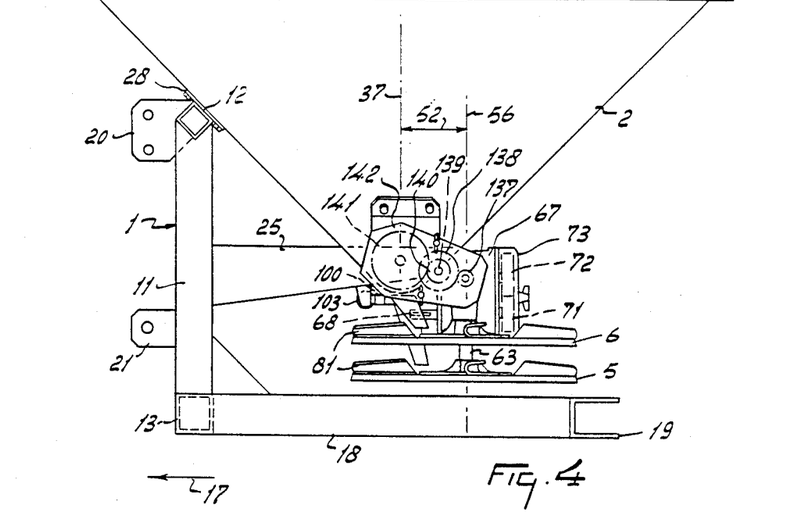

The spreader members 3, 4, 5 and 6 are mounted on a drive assembly 50, which is disposed behind the discharge funnels 32 to 35 with respect to the direction 17. The center line of the drive assembly 50 is parallel to the axis 38 and is situated at a distance 52 behind the axis 38 and the plane 37. The distance 52 is somewhat larger than one quarter of the diameter 53 of the spreader members, which have equal diameters to each other; in the illustrated embodiment the diameter 53 is approximately sixty centimeters. When the spreader is in the horizontal position, the drive assembly 50 extends horizontally. It comprises gear housings 54 in which shafts 62 and 63 are supported by bearings. The drive assembly 50 is for the greater part disposed higher than the bottoms of the discharge funnels 32 to 35. The spreader members 3 to 6 are connected to transmission members in the drive assembly 50 via their shafts 62 and 63, so that the spreader members are rotated during operation about upwardly extending rotary axes 55, which extend vertically when the spreader is in the horizontal position. Each spreader member is substantially perpendicular to its rotary axis 55. Viewed from above, the spreader members are arranged in a row which extends transversely of the direction 17. The rotary axes 55 of the four spreader members lie in a transverse plane 56, which is parallel to the plane 37. The plane 56 contains the center line 51 and is a distance 52 from the plane 37. As shown in FIGS. 1 and 3, the spreader members 4 and 5 which are nearest to the center of the machine are at the same height as each other and their axes 55 are spaced from each other by a distance 57, which is slightly larger than the diameter 53 of the spreader members 4 and 5. In this embodiment the distance 57 is approximately one sixth as large again as the diameter 53 of the spreader members 4 and 5. The spreader members 3 and 6 are at the same height as each other but at a higher level than the spreader members 4 and 5. The spreader members 3 and 6 are a distance 58 higher than the spreader members 4 and 5. The distance 58 is approximately twice the height 49 of a spreader member, measured from the bottom of its peripheral edge to the upper aspects of its spreader blades. The rotary axes 55 of the spreader members 3 and 6 are spaced by equal distances 59 from the adjacent rotary axes 55 of the spreader members 4 and 5, respectively. The distance 59 is less than the diameter 53 of the spreader members, so that the spreader members 3 and 6 overlap the respective spreader members 4 and 5 by a distance 60 which is approximately equal to one quarter of the diameter 53 of the spreader members. The spreader members 3, 4, 5 and 6 are disposed symmetrically about the longitudinal plane 36. The overall distance 61 over which the spreader members extend transversely of the direction 17 is approximately two hundred and twenty centimeters in the illustrated embodiment.

Figure 5:
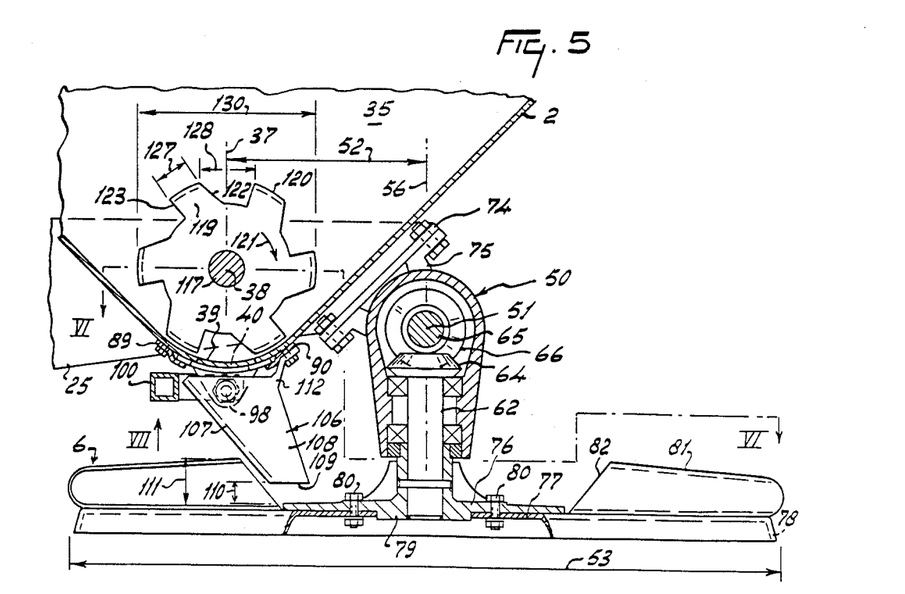

The spreader members 3 and 6 are fastened to the shafts 62, which are supported by bearings in the gear housings 54, as is shown in greater detail in FIG. 5 for the shaft 62 of the spreader member 6.

The spreader members 4 and 5 are fastened to the shafts 63, which are supported by bearings in the relevant gear housings 54 in a manner similar to that shown in FIG. 5 for the shaft 62. Because the spreader members 3 and 6 are higher, their shafts 62 are shorter than the shafts 63 of the lower spreader members 4 and 5. The respective gear housings 54 are identical and comprise bevel gearwheels 64, fitted to the upper ends of the shafts 62 and 63.

The drive assembly 50 includes a drive shaft 65 which is supported in bearings and carries bevel gearwheels 66 housed in the relevant gear housings 54. The gearwheels 66 cooperate with the bevel gearwheels 64. The drive assembly 50 also includes a transmission gearbox 67. A coupling shaft 68 is supported in bearings in the gearbox 67 and extends horizontally when the machine is in the horizontal poisition. The coupling shaft 68 projects from the front of the transmission gearbox 67, with respect to the direction of travel 17. The centerline of the shaft 68 lies in the plane 36, the gearbox 67 being symmetrical about that plane. The drive assembly is predominantly constituted by the four gear housings 54, the transmission gearbox 67 and intermediate sections 69 and 70 by which the housings 54 and the gearbox 67 are connected to each other. The intermediate sections 69 are identical to each other and are provided one each side of the gearbox 67. The gear housings 54 of the spreader members 3 and 6 are connected to the gear housings of the spreader members 4 and 5 by the intermediate sections 70, which are identical to each other and are somewhat longer than the intermediate sections 69. The drive shaft 65 extends through the gear housings 54, the gearbox 67 and the intermediate sections 69 and 70, transmission members being provided in the gearbox 67 for transmitting drive between the coupling shaft 68 and the drive shaft 65. The transmission members comprise two change gearwheels 71 and 72, the gearwheel 71 being provided on the coupling shaft 68. Access can be gained to the change gearwheels 71 and 72 by means of a removable cover 73 of the gearbox 67, so that these change gearwheels can be interchanged with each other and/or exchanged with other wheels. The change gearwheel 72 is mounted in a manner not shown on an intermediate shaft which extends parallel to the shaft 68 and is drivingly connected to the drive shaft 65, for example by means of bevel gearwheels.

The drive assembly 50 comprises lugs 75 (FIG. 5) which are connected to the intermediate sections 70 and are bolted to coupling plates 74. The coupling plates 74 are rigidly secured to the rear ends of the supporting arms 24 and 25 and extend transversely of and laterally from these supporting arms 24 and 25. Each intermediate section 70 is connectd to the coupling plates 74 by four bolts. As shown in FIG. 5, the coupling plates 74 are parallel to the rear wall of the hopper 2, which rear wall slopes upwards and to the rear. The drive assembly 50 with the spreader members 3 to 5 are consequently connected only to the frame 1, independently of the hopper 2.

The spreader members 3 to 6 are constructed identically with each other, the construction being shown in greater detail for the spreader members 5 and 6 in FIGS. 5 and 6. The spreader members each comprise a central supporting ring 76, which is rigidly fitted to the respective shaft 62 or 63. Circular plates 77 are secured by bolts 80 to the bottom surface of the ring 76. The plates 77 have downwardly turned peripheral edge regions 78. The plates 77 are perpendicular to the rotary axes 55 and are centered on downwardly directed circular bosses 79 of the rings 76. Each of the plates 77 has four spreader blades 81, which are identical to each other and are arranged. in a similar manner equidistantly about the rotary axis 55. The spreader blades have a curved cross-section and are somewhat U-shaped, opening to the front with respect to the direction of rotation (145,146) of the spreader members in operation. The bottom surfaces of the radially inner ends of the spreader blades 81 are contiguous to the circumference of the supporting ring 76. The radially inner ends of the spreader blades have edges 82 which slope upwardly and outwardly from the point where they are contiguous to the supporting ring 76, so that these edges 82 can be regarded as lying on the surface of an imaginary cone, which widens towards the top and has the rotary axis 55 of the spreader member as its central axis.

Viewed from above, the spreader blades 81 extend in a straight line outwardly and slightly to the rear from the circumference of the supporting ring 76 at an angle 83 to a radial line 84 which passes through the outer end of the rear wall 85 of the spreader blade 81. In this embodiment the angle 83 is approximately 12°, but different angles may be selected. The spreader blades 81 extend from the periphery of the supporting ring 76 to the periphery of the plates 77.

A doser plate 88 is provided near each of the outlets 40 of the discharge funnels 32 to 35. The doser plates engage the bottom surface of the curved bottom 39 with a tight fit and are supported by supporting rails 89 and 90 which are secured to the bottom 39 of the discharge funnels 32 to 35 by four bolts 91. The supporting edges 89 and 90 have portions spaced from the bottom 39 to provide grooves in which the edges of the doser plate 88 are slidably received. Each doser plate has a dosing edge 92, as shown in FIG. 7, situated under the outlet 40 of the discharge funnel 35. The dosing edge 92 is straight and the distance 93 between its ends, measured parallel to the direction 17, is larger than the corresponding dimension 94 of the discharge outlet 40. The dosing edge 92 is inclined to the sides 42 and 43 of the outlet 40, being at an angle 95 to the plane 37. The angle 95 is less than the angle 96 at which the edge 43 is inclined to the plane 37. Each of the four doser plates 88 has a turned over edge 97 which is secured by a bolt 98 to a connecting arm 99 of an adjusting arm 100. The bolt 98 is secured to the edge 97 and extends through a hole 101 in the arm 99. The bolt 98 is fixed to the arm 99 by two nuts 102. The adjusting arm 100 extends horizontally (when the spreader is horizontal) in front of the discharge funnels 32 to 35, as shown in the drawings. The adjusting arm 100 is connected to a control mechanism by which the doser plates 88 can be moved in a appropriate manner along the outlets and optionally maintained in any one of a plurality of positions relative to these outlets, to make it possible to cover the outlets 40 optionally to a greater or lesser extent. In this embodiment the control mechanism, not shown in detail, comprises a hydraulically operable adjusting member 103. The adjusting member 103 has one end connected to a lug 104 on the adjusting arm 100 and its other end pivotally connected to a lug 105 connected to the supporting arm 25. The adjusting member 103 comprises a double-acting cylinder and piston unit which enables the adjusting arm to be adjusted lengthwise in both directions. The adjusting member 103 is parallel to the adjusting arm 100.

A material guide member in the form of a discharge chute 106 which is somewhat U-shaped when seen in horizontal cross-section is situated adjacent each of the discharge outlets 40. At its top end, the chute 106 has a lug 112 which is fastened to the supporting rail 90 by means of the bolts 91. The chute 106 and the lug 112 are not shown in FIG. 7. Viewed from above, the limbs of each U-shaped discharge chute 106 are spaced apart transversely of the direction 17 by a distance which exceeds the width, measured in the same direction, of the outlet 40. The intermediate web 107 of each U-shaped discharge chute 106 extends obliquely from a position in front of the outlet 40 downwardly and to the rear (FIG. 5). The bottom end 109 of each discharge chute 106 is closer to the rotary axis 55 of the spreader member than to the edges 82. The lower ends 109 of each discharge chute 106 is a distance 110 above the upper surface of the supporting ring 76, this distance 110 being approximately half the height 111 of the inner ends of the spreader blades 81. The side walls 108 of each discharge chute 106 converge downwardly as shown more specifically in FIGS. 1 and 3.

At least one stirrer member is provided in each of the discharge funnels 32 to 35 at the bottom of the hopper. In this embodiment each discharge funnel has two stirrer members 115 and 116, which are identical for each discharge funnel. A specific example of the stirrer members is shown in plan in FIG. 6 as the stirrer members of the discharge funnel 34, while FIG. 5 is a side view of the stirrer members in the discharge funnel 35. The stirrer members are fixed to a stirrer shaft 117 which is situated in the bottom part of the hopper and extends parallel to the plane 37 through the discharge funnels 32 to 35. The axis of the stirrer shaft 117 coincides with the axis 38 about which the bottoms 39 are curved. Each stirrer member comprises a substantially circular disc 118, which is perpendicular to the shaft 107 and which has a periphery provided with projections 119. Portions of the projections are turned over at the periphery of the stirrer members 115 to form stirrer fins 120, which extend parallel to the axis 38 and are positioned concentrically around this shaft, as is shown in FIGS. 5 and 6. The diameter 130 of each stirrer member is such that its outer circumference extends to near the curved bottom 39 of the respective discharge funnel. The leading edge 122 of those portions of the projections 119 which lie in the plane of the discs 118 slopes rearwardly, with respect to the normal operative direction of rotation 121 of the stirrer members, towards the outer circumference. The trailing edge 123 of these portions of the projections 119 extend approximately radially of the center line 38 (FIG. 5). The trailing edge 123 and the respective trailing edge 124 of the adjacent stirrer fin lie in the same plane as each other. The leading edge 125 of each stirrer fin 120 slopes to the rear with respect to the direction 121 from the plane of the disc 118. The discs 118 of the stirrer members 115 and 116 are spaced apart by a distance 126, which exceeds the width of the discharge outlet opening 40, measured parallel to the shaft 117. The stirrer fins 120 of the two stirrer members 115 and 116 point towards each other. Each of the stirrer fins 120 extends parallel to the shaft 117 for a distance 127 (equal to a width) which is approximately equal to one-third of the distance 126 between the discs 118. In this embodiment, each stirrer member 115 and 116 is provided with six projections 119, which are distributed uniformly about the periphery of the stirrer member. Measured along the circumference of its stirrer member, each projection 119 has a width 127 which is less than the distance 128 between adjacent projections 119. The distance 128 is approximately one-and-a half times larger than the distance 127.

The stirrer shaft 117, which extends through the discharge funnels 32 to 35, covers the entire overall width of the lower region of the hopper and is supported in bearings 131 and 132 fixed to the side walls of the hopper 2. Thus, the stirrer shaft 117 extends through the side walls of the discharge funnels and is supported in these side walls in bushings 133 which prevent material from passing between the shaft and the discharge funnel side walls. In addition, the shaft 117 extends through openings 134 in the supporting arms 24 and 25, as shown in FIG. 6 for the supporting arm 25.

The parts of the bearing supports 131 and 132 which receive the stirrer shaft 117 are spaced from the hopper wall. The bearing support 132 is part of a gearbox 135, which is secured to the side wall of the hopper by the support 132. The gearbox 135 is connected to the endmost gear housing 54 of the drive assembly 50 by means of an end section 136. The drive shaft 65 extends through the end section 136 and into the change wheel gearbox 135. Its end situated in the box 135 carries a gearwheel 137 accommodated in the change wheel gearbox. The gearwheel 137 meshes with a gearwheel 138 which is provided on an intermediate shaft 139 in the change wheel gearbox. In addition, a change wheel 140 is provided on the shaft 139, which wheel meshes with a change wheel 141 provided on the end of the shaft 117 which is accommodated in the change wheel gearbox. The change wheel gearbox 135 has a removable cover 142, which can be secured on the change wheel gearbox by securing means 143.

For operation, the spreader is coupled to a tractor by its three-point lever linkage system. The lugs 20 are coupled to an upper rod, and the lever arms are coupled to two of the lugs 21 to 23 on each side. Depending on the size of the tractor, the lever arms can be provided between the lugs 21 and 22 or between the lugs 22 and 23. The coupling shaft 68 is coupled to the power take-off shaft of the tractor by means of an intermediate shaft.

The machine is particularly suitable for spreading spreadable material, such as granular and pulverulent fertilizer or seeds. The material to be spread is dumped into the hopper 2 and is fed from there during operation to the spreader members 3 to 6 so as to be spread. The material is spread as the spreader moves along, so that during each pass of the spreader a wide strip can be covered with material. The area density of material spread over the strip can be controlled by covering the discharge outlets 40 to a greater or lesser extent by the doser plates 88 which constitute material metering members. As a result, the desired rate of flow of material from the hopper can be achieved so as to obtain the desired area density at a given rate of travel of the spreader over the area to be spread. Adjustment of the doser plates 88 relative to the outlet 40 can be accomplished by displacing the adjusting arm 100 by means of the control mechanism, not shown. The control mechanism is of such a nature that the adjusting arm can preferably be moved by the adjusting member 103 to a desired position from the tractor. All four doser plates 88 are coupled to each other without hinges and consequently are always in a fixed position relative to each other. To this end they are all four fixed to one single adjusting arm 100, which is supported by the doser plates. The adjusting arm 100, which in this embodiment is a hollow rod of a rectangular cross-section, may alternatively be formed of one single rigid assembly in a different manner. To obtain the appropriate position of the doser plates 88 relative to the outlets 40, each doser plate 88 is adjustable relative to the adjusting arm by means of the nuts 102 and the bolt 98. Consequently, all four doser plates 88 can be accurately adjusted to the same position as each other relative to their discharge outlet. Thus the plates always cover their discharge outlets to the same extent as each other.

The dosing edges 92 are arranged such that, as each doser plate 88 moves from the fully open position of its outlet 40, its edges 92 moves in a direction relative to the outlet 40 such that the outlet is covered progressively towards the apex formed by the converging sides 42 and 43. Thus, when only a very small area of the discharge opening is left uncovered, the resulting flow opening will enable small flow rates of material to flow from the hopper.

The flow of material through the discharge outlets 40 is assisted by the stirrer members 115 and 116, which rotate during operation about the axis 38 in the direction indicated by the arrow 121. The front edges 122 of the projections 119 are positioned such that, during rotation over the bottom 39 of the respective discharge funnel, they impel the material towards the discharge outlet 40. The front edges 125 of the stirrer fins 120 are shaped such that, on rotation of the stirrer member in the direction 121, they will push the material towards the central plane 44. The result of this is that, when the outlets 40 are closed to a significant extent by the doser plates, as shown, for example, in FIG. 7, the material will be forced by the edges 125 to the open portion of the discharge outlets to provide a constant discharge for this portion of the discharge outlet. Although in this embodiment, the stirrer fins 120 of two adjacent stirrer members 115 and 116 are directly opposite each other, as is shown more specificalloy in FIG. 6, the stirrer members 115 and 116 may alternatively be shifted relative to each other, such that the stirrer fins 120 of one spreader member are opposite the recessed portions between the projections 119 of the other stirrer member. A stirrer fin 120 may be provided accurately opposite the center between two facing projections. The stirrer members 115 and 116 can alternatively be offset from each other in a different manner.

In the illustrated embodiment, the two stirrer members 115 and 116 are interconnected by means of a sleeve 129 fastened as an integral part to the shaft 117. However, the stirrer fins 115 and 116 may alternatively be mounted on the shaft 117 independently of each other. In principle it will sometimes be sufficient to provide each discharge funnel with only one stirrer member to obtain a desired outflow of mateiral through the discharge outlet. Although the drawings show triangular outlets 40, the outlets may be of different shape. For different shapes of the outlets, the dosing edges 92 of the doser plates 88 will be shaped and oriented such that, when only small portions of the outlets are left uncovered, these portions will have a largest possible surface area at a smallest possible circumferential edge.

When, as in the illustrated embodiment, there is a plurality of outlets 40 which are spaced from each other, it is useful for the doser plates 88 to be fixed together so that all of the doser plates 88 are always in the same position as each other relative to their outlets 40. To achieve this, it is helpful for the adjusting arm 100 to be rigid, and this is why it is a hollow rectangular tube in the illustrated embodiment. A further advantage is that the arm 100 extends along the row of discharge outlets 40 and the doser plates 88 are all connected to it in the same manner. In order to obtain correct adjustment of the doser plates 88 relative to the outlets 40, it is useful for the doser plates to be adjustable with respect to the arm 100 by means of the nuts 102.

Figure 2:
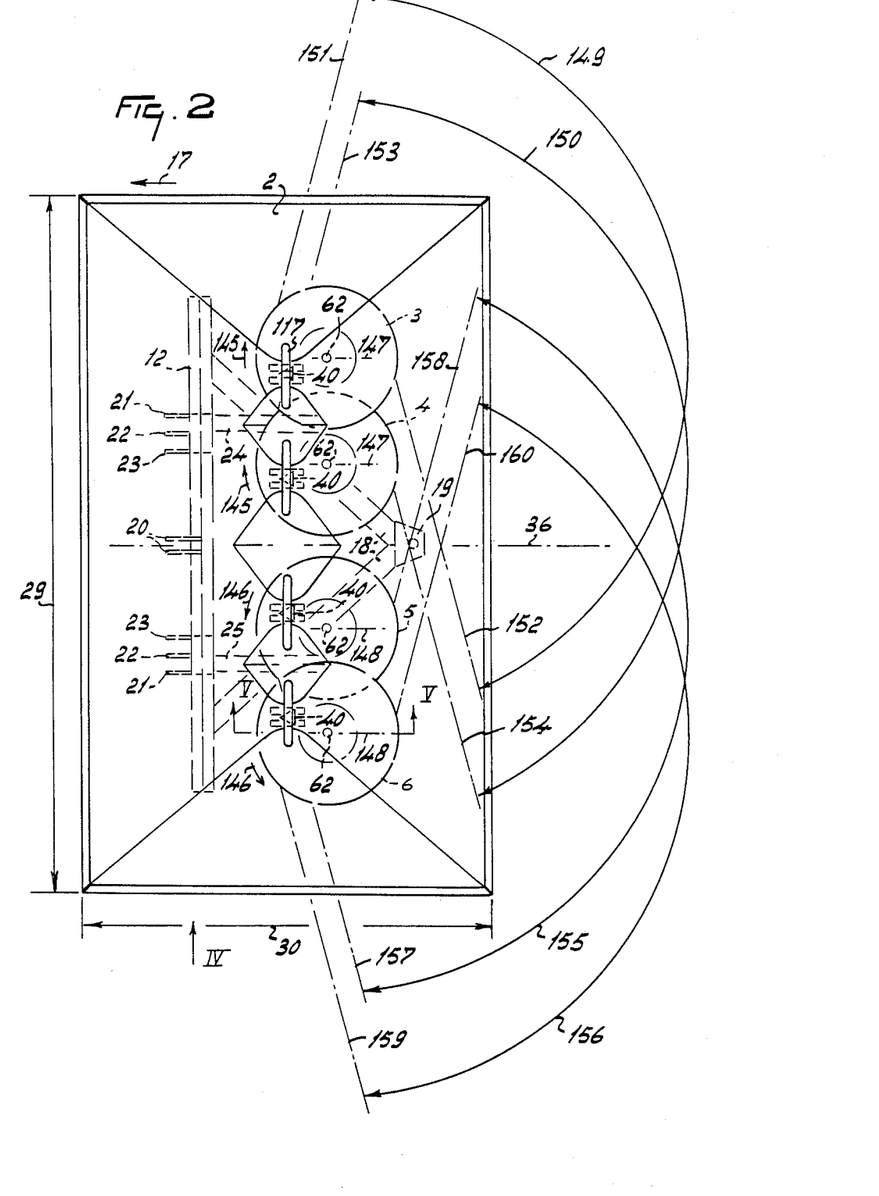

During operation, the spreader members 3 to 6 are driven from the drive shaft 65. The drive shaft 65 is driven from the coupling shaft 68 via the transmission in the gearbox 67. The relative dispositions of the bevel gearwheels 66 are such that, in the illustrated embodiment, the spreader members 3, 4, 5 and 6 will rotate during operation in the rotational directions 145 and 146 (FIG. 2). Each two spreader members on the same side of the plane 36 thus rotate in the same direction as each other while those on the other side of the plane 36 both rotate in the opposite direction. In this embodiment the spreader members 3 and 4 rotate in the direction 145 and the spreader members 5 and 6 in the direction 146. Following this rotation in opposite directions 145 and 146, the spreader blades 81 of the spreader members 3 and 4 are formed symmetrically and provided on the relevant discs 77 relative to the spreader blades 81 on the spreader members 5 and 6. Thus, the spreader members 3 and 4 are arranged and formed symmetrically with respect to the spreader members 5 and 6, about the plane 36. In operation, the fronts of the spreader members on one side of the plane 36 move to one side and the fronts of the spreader members on the other side of the plane 36 move to the other side. The fronts of the spreader members move away fron the plane 36, in the illustrated embodiment.

The shape of each of the spreader members 3 to 6, the way it is driven and the way in which material is fed to it have the effect that each of the spreader members spreads the material over substantially the same area as the other spreader members, each spreader member throwing the material during normal use for equal distances to both sides of the spreader. Depending on the speed of rotation of the spreader members and the material to be spread, it is possible for the illustrated spreader to throw the material over a width of forty-eight meters, each spreader member spreading the material over approximately twenty-four meters to one side and twenty-four meters to the opposite side of the plane 36 of the machine. Because the spreader members 3 and 4 rotate in the opposite direction to the spreader members 5 and 6, the feed apertures are also disposed symmetrically about the plane 36. More specifically, the lower ends 109 of the discharge chutes 106, as seen in plan, are disposed symmetrically about the plane 36. Thus the lower ends 109 of the discharge chutes 106 are situated over the spreader members 3 and 4 on the sides of planes 147 nearer the plane 36. The planes 147 include the rotary axes 55 of the spreader members 3 and 4 and are parallel to the plane 36. The lower ends 109 of the discharge chutes 106 above the spreader members 5 and 6 are also situated on the sides of corresponding planes 148 nearer the plane 36. In this way, the spreader members 3 and 4 spread the material symmetrically relative to the spreader members 5 and 6. Because of this symmetrical spread about the plane 36, a very good and uniform spread of the material over the overall spread width is obtained. An appropriate flow of material to the spreader members is obtained by having the lower ends 109 situated within the imaginary planes through which the edges 82 extend. It is advantageous for the ends 109 to be lower than the upper surfaces of the blades 81 and preferably they lie over the ring 76. The uniform spread is further promoted by having two spreader members on each side of the plane 36, both of which spread the material uniformly over equal spread sections. Thus the material is spread over four substantially coinciding spread sections which sections are arranged in pairs symmetrically about the plane 36 and all four of which extend for substantially equal distances to both sides of the plane 36. The construction of the spreader members and the positioning of the outlets relative to the spreader members are such that the spreader members 3 and 4 spread the material over respective sectors 149 and 150 centered on the rotary axes 55 of these spreader members. The sector 149 extends between limits 151 and 152 and the sector 150 extends between limits 153 and 154. The spreader members 5 and 6 spread the material over sectors 155 and 156, respectively. The sector 155 is centered on the respective rotary axis 55 and extends between limits 157 and 158 and the sector 156 is centered on the rotary axis 55 of the spreader member 6 and extends between limits 159 and 160. The material is spread within these sectors towards the rear with respect to the direction 17, i.e. away from that side of the spreader where the coupling plates 20 to 23 are provided. If the machine is coupled to, for example, the front of a tractor, the material will be thrown to the front when the tractor moves in its normal forward direction.

As the inner two spreader members 4 and 5 are at a lower level than the other spreader members 3 and 6, the material ejected by the spreader members 4 and 5 will not be impeded by parts of the spreader members 3 and 6. Thus the particles of material spread by the spreader members will not be obstructed by the other spreader members, nor by other parts of the spreader (see FIG. 2). Thus, the material spread by the four spreader members can always be spread without impinging against any parts of the machine. This will not adversely affect the uniform distribution by the spreader members. The uniform spread is further advantageously influenced by the fact that two of the spreader members are at a lower level than the other spreader members.

Any minor irregularities in the spread of the material by each of the spreader members will thus be advantageously compensated for by any minor irregularities in the spread patterns of the other spreader members.

When the rotary axes 55 of the spreader members lie in the vertical planes 147 and 148, the material will be spread to both sides of the plane 36, with the area density of material decreasing to zero towards the opposite edges of the covered strip. Because of the very large width across which the material can be spread, the overlap of the spread paths in a subsequent run can be such that each path is over-lapped for half of its width by the next spread path. Thus a very uniform distribution of the material over the total surface to be covered is obtained. It is then advantageous when the material decreases to zero with a uniform decrease in area density from the plane 36 towards the extreme edges. Thus the arrangement is very suitable for spreading fertilizer or seeds, since the very uniform spread of, for example, the fertilizer and/or the seed result in a uniform crop on the field.

In order to ensure that the material will always be spread over the same width, it may be desirable for the rotational speed of the spreader members for one type of material to be different from the rotational speed for another type of material. The rotational speed of the spreader members must be changed for this purpose. To do this, the change wheels 71 and 72 in the gearbox 67 can be interchanged or replaced by other wheels. Thus, with the same speed of the coupling shaft 68, the speed of the drive shaft 65 and consequently the speed of the spreader members 3 to 6 can be changed. Alternatively the speed of rotation can be used to alter the distance over which the material is spread.

The discharge of material through the discharge outlets can be advantageously influenced for the different types of material by changing the speed of the stirrer members 115 and 116. The speed of rotation of the stirrer members and their stirring shaft 117 is controlled by the speed of rotation of the drive shaft 65 and the gear ratios of the gearwheels in the change gearbox 135. The speed of rotation of the shaft 117 relative to the shaft 65 is adjustable by means of the change wheels 140 and 141 in the change wheel box 135. The change wheels 140 and 141 can be interchanged or exchanged with other wheels.

The speed of rotation of the stirrer members on the shaft 117 can consequently be altered by changing the change wheels 140 and 141 and by changing the change wheels 71 and 72. Usually, the change wheels 71 and 72 will be chosen to obtain the desired speed of the spreader members. The speed of rotation of the stirrer shaft 117 with the stirrer members 115 and 116 can then be adjusted with respect to the drive shaft 65 by the choice of the change wheels 140 and 141.

Although in this embodiment the machine comprises four spreader members, a uniform spread can be advantageously achieved when three spreader members are provided. One of these three spreader members may then be located at a height different from that of the other two members. For example, only two spreader members 3 and 6 might be used with a third spreader member disposed centrally between them at a lower level. The rotary axis of this third spreader member might then be located in the plane 36. The spreader members 3 and 6 can then rotate in the directions indicated by the arrows 145 and 146, whereas the third, lower-level spreader member can rotate in either of these rotational directions. It is alternatively possible, for example depending on the direction of rotation, for the third spreader member to be nearer to one of the spreader members 3 and 6 than to the other.

Figure 8:
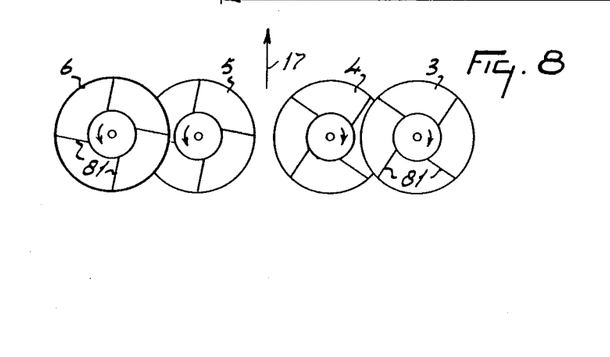
Figure 9:
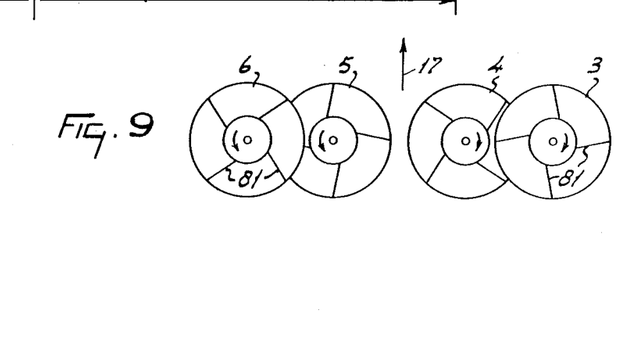

In the embodiment shown in FIGS. 1 to 7, the spreader blades of the spreader members 3 to 6 basically always have the same orientation about the respective rotary axes 55, but the spreader members may alternatively be displaced through an angle relative to each other. It is, for example, possible for the spreader blades of the spreader members at one side of the plane 36 to always have an orientation about their rotary axes which is different from that of the blades of the spreader members at the other side of the plane 36. FIG. 8 shows schematically an arrangement wherein the spreader blades 81 of the spreader members 3 and 4 have the same orientation as each other about their rotary axes, but are displaced through 45° relative to the orientation of the blades 81 of the spreader members 5 and 6. The angular displacement of 45° is equal to half the angle between two successive blades of a spreader member, which in this embodiment is 90°. Preferably, the angular displacement will be half the angle between successive blades which are preferably uniformly distributed about the rotary axis of the relevant spreader member. It is also possible to opt for an arrangement as shown in FIG. 9. In this arrangement the blades of the spreader members 4 and 5 are offset relative to each other. The spreader member 3 is arranged such with respect to the spreader member 4 so that its blades are staggered with respect to the blades of the spreader member 4. The same applies to the spreader blades of the spreader member 6 with respect to the spreader blades of the spreader member 5. Preferably, in any case the spreader members nearest to the plane 36 be arranged shifted through an angle relative to each other, as is shown in FIGS. 8 and 9. The fact that the spreader members are shifted with respect to each other on both sides of the symmetry plane has an advantageous influence on a uniform distribution, as the risk of collision between particles of material spread by the different spreader members is reduced.

A spreader produced in accordance with the present invention may have a very large working range, a highly precise spreading action and a very large capacity storage hopper.

Because the spread patterns overlap many times, maximum precision is achieved. This precision is further ensured by the fact that the spreader blades are directly coupled to each other, without hinges, The large hopper capacity of, for example, two thousand liters, means that sufficient material can be spread per hectare over a very large effective spread width, even if the machine travels fast over the field. Consequently, the area which can be covered in a given period of time is very high, which increases productivity.

From the point of view of construction, a very advantageous machine is obtained with the embodiment shown. Providing the spreader members on the drive assembly 50, which is fastened only to the frame arms 24 and 25, provides a simple and good connection of the spreader members with their drive means to the frame. the machine can therefore be of a simple structure.

Although various features of the spreader described and illustrated in the drawings are set forth in the following claims as inventive features, the invention is not necessarily limited to these features and encompasses all inventive features disclosed both individually and in various combinations.

Having disclosed my invention, what I claim as new and to be secured by Letters Patent of the United States is:

1. A spreader for granular or powdery material which comprises a frame, a hopper, and at least three spreader members carried by said frame which rotate about substantially vertical axes and are constructed and arranged to receive said material from said hopper, said hopper having at least three discharge outlets and an adjustable doser member for each said discharge outlet, all of said spreader members adapted to receive said material from said discharge outlets so that such material received by all of said spreader members is simultaneously broadcast onto ground and/or crop areas which substantially coincide throughout as said material is being so broadcast, two of said spreader members being disposed at the same height above the ground and at least one of said spreader members being disposed at a lower height above the ground and overlapping as seen in plan with at least one of said two higher spreader members, and drive means connected to rotate said two higher spreader members in opposite rotational directions so that said higher spreader members closest edges are moving in the spreader's operative direction of travel, the remaining said lower spreader member arranged and constructed so that it is paired with and driven by said drive means in the same direction of rotation as one of said higher spreader members.

2. A spreader as claimed in claim 1, in which four of said spreader members are provided and disposed in a row extending transversely of the normal intended direction of travel of the spreader, the innermost two said spreader members being spaced from but at the same height above the ground as each other and the outermost two said spreader members being at a greater height above the ground but respectively overlapping said innermost spreader member immediately inboard thereof.

3. A spreader as claimed in claim 2, in which said overlapping spreader members overlap each other for a distance which is approximately one-quarter of the rotational diameter of at least one of such spreader members.

4. A spreader as claimed in claim 2, in which said spreader members are disposed symmetrically about a central vertical plane of the spreader which extends in the intended direction of operative travel of the spreader.

5. A spreader as claimed in claim 2, comprising drive means connected to rotate said spreader members which, in operation, causes said two innermost spreader members to rotate in opposite rotational directions and causes each of said outermost spreader members to rotate in the same rotational direction as the respective said innermost spreader member that it overlaps.

6. A spreader as claimed in claim 5, wherein said four spreader members are arranged so that there are two on each side of a central vertical plane through the spreader's center and extending in its usual direction of travel, said spreader members being connected to said drive means so that, in operation, said spreader members on one side of said vertical plane both rotate in one direction and said spreader members on the other side of said central vertical plane both rotate in the opposite direction.

7. A spreader as claimed in claim 6, in which each said spreader member on its inboard side is rotating during operation in the same direction as the spreader's usual direction of travel.

8. A spreader as claimed in claim 1, in which said spreader members' said rotary axes are parallel to each other and lie in a plane which extends substantially perpendicular to the normal intended direction of operative travel of the spreader.

9. A spreader as claimed in claim 1, comprising fastening means for coupling the spreader to variously sized 3-point lifting devices provided on prime movers, irrespective of whether said lifting devices are at the front or the rear of said prime movers said spreading members being arranged with respect to said fastening means in a manner that distribution of material over substantially the same area during operation by said spreading member is substantially undiminished.

10. A spreader as claimed in claim 1, wherein the construction and disposition of said spreader members are such that said areas on which said spreader members distribute material are disposed symmetrically with respect to a central longitudinal vertical plane of the spreader extending in its usual direction of travel.

11. A spreader as claimed in claim 1, wherein each said spreader member is in the form of a spreading disk provided with at least two equidistantly spaced spreader blades, said spreader blades having a curved cross-section that is approximately "U" shaped, open to the front with respect to the direction of rotation of said disk on which it is provided, and extend outwardly at a slight rearward angle with respect to a plane containing such disk's axis of rotation and tangent to the innermost part of the corresponding said blade.

12. A spreader as claimed in claim 11, wherein the relative orientation of said spreader blades of all of said spreader members as seen in plan are different from each other.

13. A spreader as claimed in claim 11, wherein the relative orientation of said spreader blades of said two innermost spreader members as seen in plan are different from each other.

14. A spreader as claimed in claim 13, in which said spreader blades of said spreader members located on one side of said central vertical plane have the same said relative orientation as each other.

15. A spreader as claim in claim 1, in which the difference in heights above the ground of said overlapping spreader members is approximately twice the vertical, dimensions each of of said spreader members, said vertical dimensions being substantially equal.

16. A spreader as claimed in claim 1, in which said two innermost spreader members are spaced from each other by a distance which is approximately one-sixth of the diameter of at least one of such spreader members.

17. A spreader as claimed in claim 1, in which at least one of said spreader members further comprises a central ring and a circular plate on which at least two equidistantly spaced spreader blades are provided, said central ring being higher than said circular plate, and securing means that removably secures said circular plate to said central ring.

18. A spreader as claimed in claim 17, comprising spreader blades which extend from a radially inner position adjacent said central ring to the circumference of the respective said spreader member in a direction inclined to the rear with respect to the normal direction of operative rotation of such spreader member.

19. A spreader as claimed in claim 18, in which each said spreader blades' radially inner end extends obliquely upwardly and is in an imaginary upwardly incline conical surface the axis of which coincides with the rotary axis of the spreader member.

20. A spreader as claimed in claim 1, further comprising shafts extending upwardly from said spreader members to locations above said spreader members, a drive assembly including a drive shaft to which said spreader member shafts are drivably connected at said locations, and bearings in said drive assembly supporting said member shafts.

21. A spreader as claimed in claim 20, in which said drive assembly extends horizontally and transversely of the normal intended direction of operative travel of the spreader.

22. A spreader as claimed in claim 21, in which said drive assembly extends along the lower region of said hopper and is disposed at a higher level than the bottom of said hopper.

23. A spreader as claimed in claim 22, in which said drive assembly is situated on the side of said hopper to which material is spread during operation.

24. A spreader as claimed in claim 23, in which said drive assembly comprises gear housings at said locations by which said spreader member shafts are supported in said bearings and intermediate sections, said gear housings being connected to each other by said intermediate sections, said drive assembly also comprising a transmission gearbox incorporating a coupling shaft which is connectible to a drive such as a power take-off shaft of a prime mover.

25. A spreader as claimed in claim 24, in which said transmission gear box is entirely disposed higher than said spreader members and comprises a transmission means for changing the gear ratio between that input by said coupling shaft from said power take-off shaft and that further input to said gear housings by said drive shaft which extends horizontally above all of said spreader members.

26. A spreader as claimed in claim 1, comprising outlet openings in said hopper, one of said outlet openings over each said spreader member, a respective dosing plate slidably received over each said opening selectively covering and uncovering said opening to varying degrees.

27. A spreader as claimed in claim 20, comprising a frame, said drive assembly for the spreader members being supported from said frame independently of said hopper.

28. A spreader as claimed in claim 27, wherein said frame comprises portions in front of said hopper and frame arms extending respectively therefrom under said hopper, said drive assembly being attached behind said hopper at the ends of said frame arms.

29. A spreader as claimed in claim 1, wherein each end of said discharge portion further comprises a discharge outlet and an adjustable doser member, each said spreader member being adjacent to a corresponding discharge portion of said hopper and receiving material from said discharge portion's discharge outlet.

30. A spreader as claimed in claim 27, in which said hopper discharge outlets are provided symmetrically relative to a central vertical plane which contains the longitudinal center line of the spreader and extends in the intended direction of operative travel.

31. A spreader as claimed in claim 30, in which said hopper discharge outlet for each said spreader member are nearer to said central vertical plane than is the rotary axis of the respective said spreader member.

32. A spreader as claimed in claim 29, in which a material guide member is disposed between at least one said hopper discharge outlet and its corresponding said spreader member, said material guide member having one end situated near said one discharge outlet and the other end situated over the circumference described by the inner ends of a spreader blade of said corresponding spreader member.

33. A spreader as claimed in claim 29, in which said adjustable dosing members are provided near each said hopper discharge outlet, said dosing members being coupled to each other whereby they are fixed relative to each other, said dosing members including doser plates which are rigidly fastened during operation to an adjusting arm which extends along said hopper discharge outlets and is adjustable by a control mechanism which is associated with said adjusting arm, each said doser plate being movable by said adjusting arm to open and close to a greater or lesser extent a corresponding said hopper discharge outlet opening, said opening and said adjustable dosing members being so configured that the angular width of the uncovered opening increases both in a clockwise and counterclockwise direction as said dosing member uncovers said opening.

34. A spreader as claimed in claim 1, in which four of said rotary spreader members are disposed so that their rotary axis of rotation are adjacent and contained in a vertical plane transverse to the spreader's normal operational direction of travel, the outboard of said spreader members each being higher than and overlapping the inboard of said spreader members, the overall width of said four spreader members being about seventy-five to eighty-five percent of said hopper's overall width, said hopper having an overall width which is not less than approximately two hundred and sixty centimeters and is not more than approximately three hundred centimeters.

35. A spreader as claimed in claim 34, in which said spreader members are disposed within said width and the length of said hopper as seen in plan, a drive assembly for said spreader members extending over a distance which is approximately equal to said overall width of spreader members, measured transversely of the normal intended direction of operative travel of the spreader.

36. A spreader as claimed in claim 34, in which said hopper is rectangular in plan view, its broader sides extending transversely of the normal intended direction of operative travel of the spreader, said hopper being symmetrical with respect to a longitudinal central plane of the spreader and with respect to a transverse central plane which is perpendicular to the longitudinal central plane, the hopper comprising four discharge funnels, one for each of said spreader members.

37. A spreader as claimed in claim 34, comprising a drive assembly in which said spreader members are provided on frame portions of the spreader, the spreader's frame comprising an upwardly extending said frame portion which is located predominantly at one side of said hopper and to the upper end of which said hopper is attached, this frame portion being connected to horizontally extending supporting arms which extend under said hopper and to which said drive assembly is attached.

38. A spreader for granular or powdery material, which comprises;
   a frame,
   at least three spreader members carried by said frame which rotate about substantially vertical axes and are constructed and arranged to receive the material to be spread,
   a hopper for holding the material to be spread,
   said hopper comprising at least three discharge portions, one said discharge portion for and adjacent to each said spreader member for feeding material from said hopper to the corresponding said spreader member, said discharge portion further comprising a discharge outlet, and adjustable dosing member and a material guide member, said hopper discharge outlets being triangular, one side of each such discharge outlet extending perpendicularly to the normal direction of operative travel of the spreader, the other two sides being of equal length and being inclined to a direction of displacement of said doser member, said doser member having a dosing edge which is inclined to the direction of displacement of said doser member by an angle which is smaller than the angle enclosed by the sides of said triangular discharge outlet having said direction, two of said spreader members being disposed at the same height above the ground and at least one of said spreader members being disposed at a lower height above the ground and overlapping as seen in plan with at least one of said two higher spreader members, and drive means connected to rotate said two higher spreader members moving in opposite rotational directions so that said higher spreader members' closest edges are moving in the spreader's operative direction of travel, the remaining lower said spreader member being paired with and having a direction of rotation the same as one of said higher spreader members so that said material received by all of said spreader members is simultaneously broadcast onto ground and/or crop areas which substantially coincide throughout as said material is being so broadcast.

39. A spreader comprising a frame, a hopper and a spreader member for spreading material, said hopper having at least three discharge outlets, a doser member for each said discharge outlet, said doser members being rigidly connected to each other by a single adjusting arm for simultaneous movement through the same distance so that the respective said discharge outlets can be simultaneously opened or closed by the same amount of movement of said doser members to a greater or lesser extent, each said doser member and said discharge outlet being configured and cooperating so that the angular width of each discharge outlet as it is opened increases simultaneously in both clockwise and counterclockwise directions.

40. A spreader as claimed in claim 39, in which said doser members are rectilinearly movable over said discharge outlets, said single adjusting arm extending along said discharge outlets and being movable in its lengthwise direction which is transverse to the spreader's operative direction of travel.

41. A spreader as claimed in claim 40, in which each of said dozer members comprises doser places adjustably connected to said adjusting arm.

42. A spreader as claimed in claim 40, in which said adjusting arm is horizontal and extends horizontally along the bottom of said hopper.

43. A spreader as claimed in claim 42, in which said doser members are movable in a direction parallel to a row of spreader members including said spreader member, said hopper having for each member spreader member a discharge funnel with at least one said discharge outlet, said adjusting arm for said doser members extending along these discharge funnels.

44. A spreader as claimed in claim 43, in which each said doser member has a dosing edge which is inclined by less than 90° to the direction of displacement of said doser members.

45. A spreader as claimed in claim 44, comprising a central mechanism to which said adjusting arm is coupled, said control mechanism comprising a hydraulically operable adjusting member for displacing said adjusting arm in an opposite direction for closing or opening said discharge outlets to a greater or less extent.

46. A spreader as claimed in claim 40, in which a stirrer member is provided in said hopper near said discharge outlet, said stirrer member being rotatable about a horizontal axis.

47. A spreader as claimed in claim 46, in which said stirrer member is coupled to a stirrer shaft which is drivably connected to a drive shaft of said spreader member, transmission means being provided between said drive shaft and said stirrer shaft, said transmission means being adjustable to change the gear ratio between said stirrer shaft and said drive shaft.

48. A spreader as claimed in claim 47, in which said stirrer shaft is supported in bearings provided near side walls of said hopper and spaced from these hopper side walls.

49. A spreader as claimed in claim 47, comprising a change gear wheel gearbox in which said stirrer shaft is supported at one end and also in which an end of said drive shaft is located, two change gear wheels being provided between said drive shaft and said stirrer shaft, said change gear wheels being interchangeable and/or exchangeable for a different set of change gear wheels.

50. A speader as claimed in claim 47, in which said stirrer member comprises a disc having at its periphery projections, ends of said projections being located near said hopper's bottom.

51. A spreader as claimed in claim 50, in which at least a portion of each of said projections extends in the plane of said disc and has an edge which extends rearwardly towards said periphery with respect to the direction of operative rotation of said stirrer member.

52. A spreader as claimed in claim 50, in which said stirrer member has at its periphery at least one stirrer fin which extends laterally from said disc and has an edge which extends away from said disc to the rear with respect to the direction of operative rotation of said stirrer member.

53. A spreader as claimed in claim 52, in which two spaced-apart stirrer members, having said stirrer fin and further like stirrer fins which face each other and move along said discharge outlet during operation, are disposed near a said dicharge outlet.

54. A spreader as claimed in claim 50 in which the rotary axis of said stirrer member extends parallel to said hopper's bottom.

55. A spreader as claimed in claim 54, in which said hopper's bottom extends arcuately about the stirrer member, said stirrer members extending adjacent said arcuate bottom of said hopper.

56. A spreader as claimed in claim 55, in which said hopper has a width, measured transversely of the normal intended direction of operative travel of the spreader, which is not less than approximately two hundred and sixty centimeters and is not more than approximately three hundred centimeters.

57. A spreading for granular or powdery material which comprises a frame, a hopper, and at least three spreader members carried by said frame which rotate about substantially vertical axes and are constructed and arranged to receive said material from said hopper, all spreader members adapted to receive said material thereon so that such material is simultaneously broadcast onto the ground and/or crop areas which substantially coincide throughout as said material is being so broadcast, two said spreading members being disposed at the same height above the ground and at least one of said spreader members being disposed at a lower height above the ground and overlapping as seen in plan with at least one of said two higher spreader members, and drive means connected to rotate said two higher spreader members in opposite rotational directions so that said higher spreader members closest edges are moving in the spreader's operative direction of travel, the remaining lower spreader member arranged and constructed so that it is paired with and driven by said drive means in the same direction of rotation as said higher spreader member with which it is paired, all the said spreader members having substantially the same diameter and being substantially identical to each other except that the structure of one of said higher spreader members is symmetrical to the structure of the other said higher spreading member.

58. A spreader for granular or powdery material which comprises a frame, a hopper, and at least three spreader members carried by said frame which rotate about substantially vertical axes and are constructed and arranged to receive said material from said hopper, said hopper having at least three discharge outlets, each said discharge outlet disposed above a respective said spreading members so that each spreading member has its own discharge outlet from which it receives material to be broadcast simultaneously by all spreading members onto the ground an/or crop areas that substantially coincide throughout as said material is being so broadcast, at least two of said spreading members being disposed at the same height and at least one of said spreading members overlapping with another said spreading member as seen in plan, said two spreading members which are the same height being rotated in opposite directions and said overlapping spreading member being rotated in the same direction as the spreading member with which it overlaps, the outlet openings over said spreading members which are at the same height being closer together than the axes rotation of those said spreading members, and the axes of rotation of said two spreading members which are overlapping being located relatively on the same side of their respective axes of rotation.

* * * * *